(12) United States Patent
Chapman et al.

(10) Patent No.: US 9,282,215 B2
(45) Date of Patent: Mar. 8, 2016

(54) SECURITY MARK WITH COPYABLE AND NON-COPYABLE ELEMENTS

(71) Applicant: Xerox Corporation, Norwalk, CT (US)

(72) Inventors: Edward N. Chapman, Rochester, NY (US); Reiner Eschbach, Webster, NY (US); Judith E. Stinehour, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 54 days.

(21) Appl. No.: 14/188,783

(22) Filed: Feb. 25, 2014

(65) Prior Publication Data

US 2015/0244897 A1 Aug. 27, 2015

(51) Int. Cl.
H04N 1/32 (2006.01)
B42D 25/305 (2014.01)

(52) U.S. Cl.
CPC .......... *H04N 1/32309* (2013.01); *B42D 25/305* (2014.10); *H04N 1/32304* (2013.01); *H04N 1/32325* (2013.01); *H04N 1/32352* (2013.01); *H04N 2201/3228* (2013.01)

(58) Field of Classification Search
None
See application file for complete search history.

(56) References Cited

U.S. PATENT DOCUMENTS

| | | | |
|---|---|---|---|
| 5,734,752 A * | 3/1998 | Knox | 358/3.28 |
| 5,790,703 A | 8/1998 | Wang | |
| 6,108,512 A | 8/2000 | Hanna | |
| 6,252,971 B1 | 6/2001 | Wang | |
| 7,126,721 B2 | 10/2006 | Wang et al. | |
| 7,301,675 B2 | 11/2007 | Wang et al. | |
| 7,580,153 B2 | 8/2009 | Eschbach et al. | |
| 8,259,361 B2 | 9/2012 | Morales et al. | |
| 8,310,718 B2 | 11/2012 | Chapman et al. | |
| 8,342,576 B2 | 1/2013 | Eschbach et al. | |
| 2010/0231980 A1 * | 9/2010 | Chapman et al. | 358/3.28 |
| 2013/0272523 A1 | 10/2013 | McCorkindale et al. | |

FOREIGN PATENT DOCUMENTS

EP 2230828 A2 9/2010

* cited by examiner

*Primary Examiner* — Thomas D Lee
(74) *Attorney, Agent, or Firm* — Fox Rothschild LLP (57) ABSTRACT

A document contains a security element that combines a correlation mark and microgloss mark so that foreground pixels of the correlation mark are printed in a toner of a first color, and pixels of the correlation mark overwrite portions of the correlation mark in a second color, but neither the first color nor the second color appear on areas that correspond to background pixels of the correlation mark.

18 Claims, 10 Drawing Sheets

SECURITY MARK WITH COPYABLE AND NON-COPYABLE ELEMENTS

BACKGROUND

Security is an important requirement in many document printing applications. In situations such as official or government document printing, event ticket printing, financial instrument printing and the like, many printed documents must be protected against copying, forging and/or counterfeiting.

One example of such a document is a prescription for medication. Upon receipt of a printed prescription, the pharmacist would like to have a good level of confidence that the document is genuine and is being used only once, by the person to which the prescription was issued. In applications such as this it is important that the document have a security feature that is difficult or impossible to copy, so that a single, valid, original prescription document is not used to create counterfeit copies that also contain the security feature. A security mark that does not survive reproduction is commonly called "fragile."

Another example document is a confidential company customer list. In this situation, the document's creator may be concerned about the document falling into unauthorized hands and being altered. Thus, in a situation such as this, it is important that the security mark survive reproduction and distribution so that the document can tracked and/or the security mark decoded. A mark that does survive reproduction is commonly called "robust."

For these reasons, many documents have multiple security elements, some of which are fragile and others of which are robust. This can require a substantial amount of document space to be dedicated to the security marks, as two marks typically require twice the space as one mark requires. In addition, many existing marks can be easily "cracked" (i.e., decoded by unauthorized users). To guard against this, many security printing processes require special materials, which typically increases printing costs.

This document describes methods and systems for creating and using a security mark that addresses at least some of the problems described above, and/or other problems.

SUMMARY

In an embodiment, a processor executes programming instructions to implement a method of embedding multiple security elements in a document as a single mark. The security elements include a correlation mark and a microgloss mark. The processor identifies a first set of instructions for printing a correlation mark security element on a substrate. The correlation mark security element includes foreground pixels (which include pixels for a frame and pixels for a hidden security element) and background pixels (which are pixels that are not part of either the frame or the hidden security element—i.e., white space). The processor creates a mask for printing the correlation mark security element on the substrate. The processor also identifies a second set of instructions for printing a microgloss security element on the substrate. The microgloss security element includes a set of microgloss pixels to which toner will be applied at various thicknesses. The processor maps one or more instances of the microgloss security element to one or more instances of the correlation mark element through the mask to yield a combined mark for which the toner of the microgloss security element will only be printed on the substrate where the foreground pixels appear and not where the background pixels appear. A printing device then prints the combined mark on the substrate.

Optionally, before creating the mask, the processor may modify the correlation mark security element to increase a density of the foreground pixels in at least one area on which the microgloss security element pixels will be printed. Modifying the correlation mark security element to increase the density of the foreground pixels in at least one area may include, for the at least one area, expanding a section of a foreground section in that area while maintaining the section's center point location, and reducing a corresponding thickness of a corresponding background section while maintaining a center point location for the background section.

Optionally, creating the mask for printing the correlation mark security element on a substrate may include defining a rule set for printing toner at locations on the substrate that correspond to the foreground pixels of the correlation mark security element while not printing toner at locations on the substrate that correspond to the background pixels of the correlation mark.

Optionally, mapping the instances of the microgloss security element to the one or more instances of the correlation mark element through the mask may include eliminating any pixels of the microgloss element that would, if printed, appear on or under background pixels of the modified correlation mark element. In addition, mapping the instances of the microgloss security element to the one or more instances of the correlation mark element through the mask may include overwriting any pixels of the correlation mark element that coincide with any pixel of the microgloss element.

Optionally, printing the frame on the substrate may include printing a first color on the substrate at locations where the correlation mark alone would appear but not at locations where a second color of the microgloss mark alone would appear, and printing the second color of the microgloss mark on the substrate at locations where both the correlation mark and the second color microgloss mark would appear. The printing also may include printing neither the first color nor the second color on the substrate at locations that correspond to background pixels of the correlation mark.

In another embodiment, a document is imprinted with a combined security mark. In particular, the document may include a frame of a combined correlation mark and microgloss mark printed on a substrate. The frame may include foreground pixels of the correlation mark in a toner of a first color, wherein the first color is distinct from an area of the substrate on which background pixels of the correlation mark will appear. The frame also may include pixels of the microgloss mark in a toner of a second color, over positions where both the microgloss mark and correlation mark appear on the substrate. The background pixels of the correlation mark exhibit neither the first color nor the second color. In some embodiments, the pixels of the microgloss mark may have a pile height that is greater than that of the pixels of the correlation mark.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms of any word, and defining adjectives such as "a," "an" and "the," each include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

Watermarks are security elements that can provide for the authentication or tracking of documents. For example, American currency carries a watermark that can be observed under the correct viewing conditions. In particular, if one holds a current $5 or greater American bill up to a light, a watermark bearing the image of the person whose portrait is on the bill will be revealed. The watermark helps prevent counterfeiting because it represents a technological hurdle for counterfeiters. As such, the watermark helps authenticate the currency. Microgloss and correlation marks are examples of newer watermarks requiring no special materials.

A correlation mark is a watermark containing one or more elements that are invisible or hardly visible on a printed document. These hidden elements become visible when the document is viewed through a correlation mask that serves as a "key" to the correlation mark. An example of a correlation mark is taught in U.S. Pat. No. 5,734,752 titled "Digital watermarking using stochastic screen patterns," the disclosure of which is incorporated herein by reference in its entirety. A correlation mark is typically robust, and can be copied by typical duplication methods.

Correlation marks can be detected either by scanning or capturing an image of a document containing the mark and processing the scanned/captured image, or by overlaying a transparency containing a "key" on top of the document to reveal the hidden watermark. A pattern printed onto a transparency is an example of such a transparency, which may be referred to as a correlation mask. The pattern in the mask may be a stochastic screen that corresponds to pixel elements of mark. Aligning the correlation mask to the printed document or image causes a correlation image to become visible.

To generate a correlation mark, the system may retrieve and/or print a stochastic screen pattern for the mark that is stored in a memory. Or, the system may generate a correlation mark by producing a first stochastic screen pattern for the mark, and a second stochastic screen pattern for the correlation mask, using methods such as those described in U.S. Pat. No. 5,734,752. When generating or printing the correlation mark, all foreground pixels of the mark may have the same or similar grayscale values. Alternatively, the foreground pixels of the mark may be of different colors, with pixels of the hidden image being of one grayscale or RGB value, and other pixels of the mark exhibiting one or more other grayscale or RGB values. In this document, the term "foreground pixel" refers to a pixel of the correlation mark that will, when printed on a substrate or displayed on a display, appear as a dark element. In the context of a correlation mark, this may mean that the pixel represents either the hidden security element or the visible text box that surrounds the hidden security element. In comparison, a "background pixel" will be one that appears as white or a color that is visibly different from that of the foreground pixels.

Figure 1A:
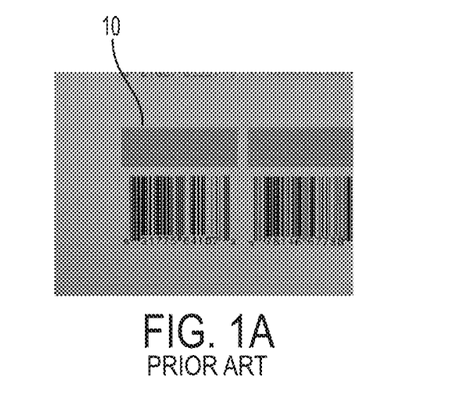
FIGS. 1A and 1B illustrate an example of a printed correlation mark such as may be found in the prior art, along with the use of a correlation mask to decode the mark.
Figure 1B:
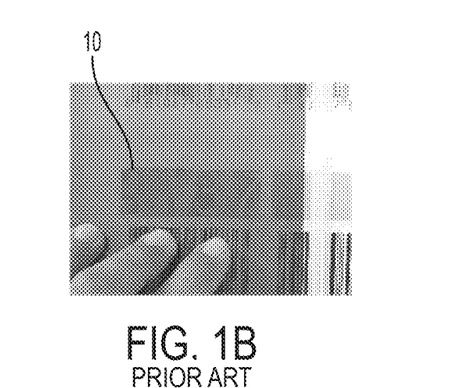

An example of a how a correlation mark may be decoded in accordance with the prior art is shown in FIGS. 1A and 1B. FIG. 1A shows an example of a printed correlation mark, in which the watermark is hidden text that is encoded in the mark. FIG. 1B illustrates that when a user places the correlation mask over the correlation mark, the hidden text is revealed through the mask. Correlation marks are typically considered to be robust marks, as they will survive normal photocopying and will be rendered on a photocopied document.

Figure 2:
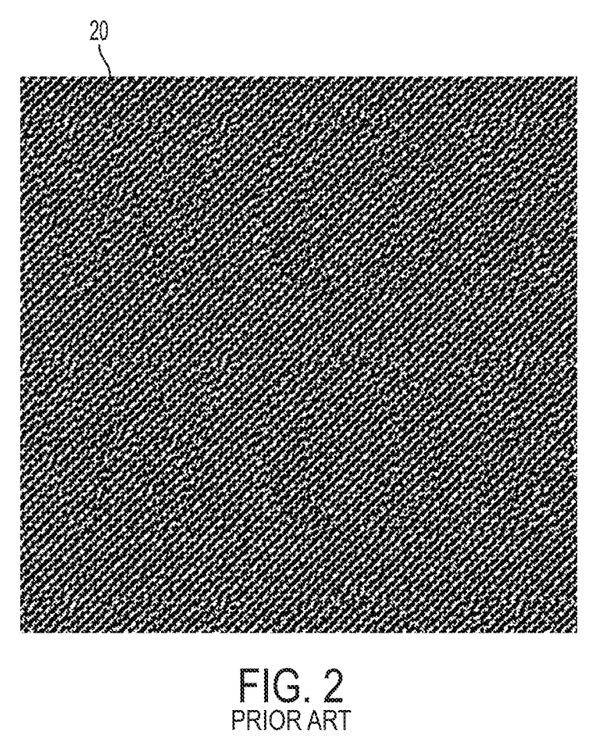
FIG. 2 is a large scale example of a correlation mark of the prior art.

FIG. 2 shows an enlarged example of a correlation mark 20 in accordance with the prior art. In this magnification, one who studies the mark closely may see the outlines of a mark containing the hidden letters "WOR."

Figure 3A:
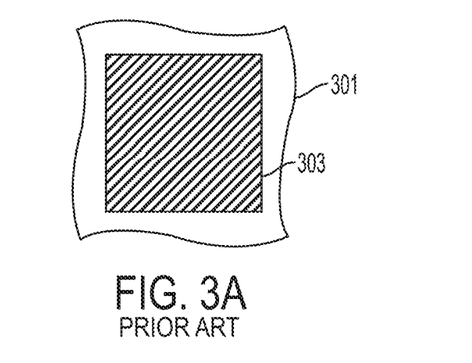
FIGS. 3A and 3B illustrate an example of a document printed with a microgloss element of the type that may be found in the prior art.
Figure 3B:
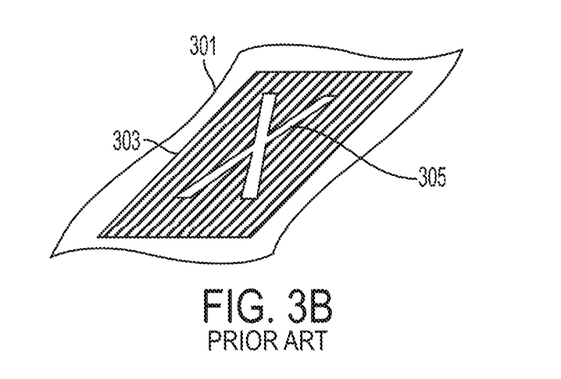
Figure 4:
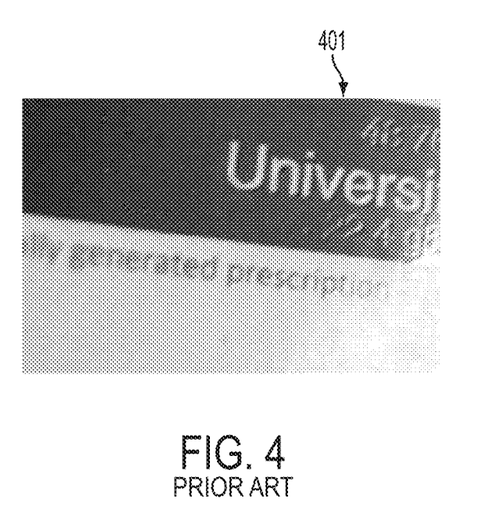
FIG. 4 is an example of a microgloss mark of the prior art.

A microgloss mark is a security marking containing elements (such as pixels) having colorant combinations that are similar as perceived by a human observer, but that have varying thicknesses (which may be measured in terms of stack height or pile height) as printed on the substrate so that a security code is not seen when a human views the substrate straight-on, but which is seen when the substrate is viewed at an appropriate angle. An example of this is shown in FIGS. 3A and 3B, where a document 301 is imprinted with a microgloss mark 303. No security codes are visible when the document 301 is viewed straight-on as in FIG. 3A. However, FIG. 3B illustrates that when viewed at an angle, the thicknesses of elements associated with the security code 305 (in this case, an "X") will be visible. The elements that exhibit a first thickness will use the first color, and the elements exhibiting a second thickness will use the second color. Additional versions and options for making microgloss marks are disclosed in U.S. Pat. No. 8,310,718, the disclosure of which is incorporated herein by reference in its entirety. FIG. 4 illustrates an example of a microgloss mark 401, which may be seen at a vantage point at an angle with respect to the substrate so that the indented microgloss mark is visible. Microgloss marks are generally considered to be fragile, that is they will not survive photocopying. When a document containing a microgloss mark is photocopied, the microgloss mark will not carry through to the copy because of its three-dimensional features.

In the embodiments of this document, methods of generating and/or printing a security element that contains both fragile and robust elements is disclosed. In particular, the security elements generated by the methods of this document combine the elements of a correlation mark type security element and a microgloss mark type security element. The system may first generate, retrieve and/or print a correlation mark type element such as that shown in FIG. 2. The system will then create a pattern that will be used to combine the fragile microgloss element with the robust correlation mark.

Figure 5:
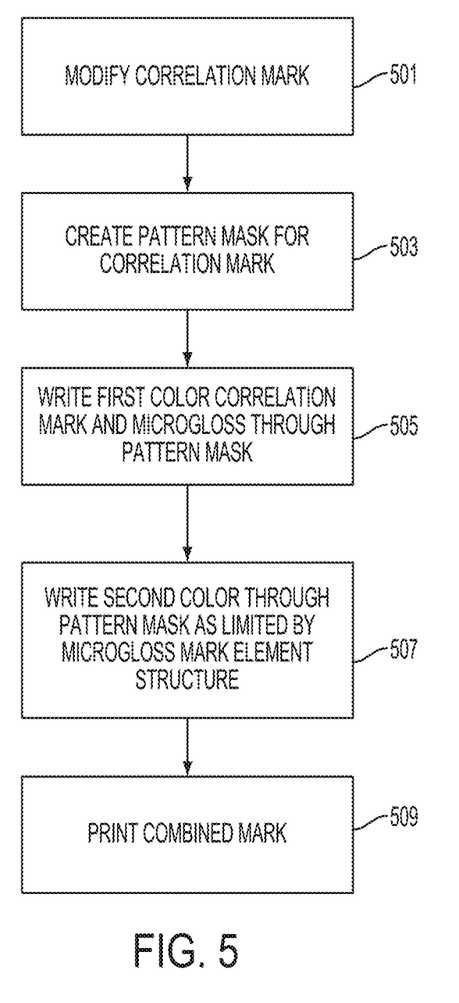
FIG. 5 is a flowchart illustrating a process of developing and printing security element having both robust and fragile features.

To preserve the integrity of the correlation mark, the system will ensure that the pixels of the microgloss mark are only printed in areas where the foreground correlation mark pixels will appear, and not over the background (i.e., the white space between the pixels) of the correlation mark. In this way, the microgloss mark pixels do not fill in the white space (or background) between the correlation mark element pixels. FIG. 5 illustrates a method by which a system may implement a process of determining how to print a single mark containing robust and fragile elements. The system may first identify a correlation mark, including the positions of its foreground and background pixels. In some embodiments, the system may modify (step 501) the correlation mark to expand the thickness of at least some of its foreground mark elements while maintaining the periodic nature of the foreground elements. This will correspondingly reduce the thickness of at least some of the background elements of the correlation mark. In other embodiments, the thicker correlation mark may be pre-defined, such as may appear in an alternate font. The system will then create a pattern mask (step 503) to indicate where the variable data elements of the correlation mark will appear on the substrate. Any now or hereafter mask design may be used, such as those that are used in page description languages such as PostScript™.

To combine the correlation mark with a microgloss mark, the system will first write the correlation mark by writing the pattern mask to a memory, as well as a first color of the microgloss mark (step 505). After this step, all elements of the correlation mark will be written to memory as the first color. The system will then write the variable data of the microgloss mark through the mask (step 507) using a second color. In the microgloss mark writing step (step 507), pixels corresponding to the microgloss mark will be written through the mask and will overwrite the first color pixels in areas where the second color of the microgloss mark will appear. In both steps 505 and 507, neither the correlation mark elements nor the microgloss elements will write through the mask to any areas that correspond to background elements (i.e., white space) of the correlation mark. In this way, the system will map the microgloss mark to the correlation mark to define a mask that will contain elements of both the microgloss mark and the correlation mark.

The system uses the mask to define a frame for the combined mark as a print file or set of instructions that cause the second color pixels of the microgloss mark to only print in positions of the substrate that also contain foreground pixels of the correlation mark. The system may do this by developing a print file containing instructions to print both the second color microgloss pixels and the first color correlation mark/microgloss pixels, or it may do this by developing instructions to limit the pixels of the correlation mark that will be printed. It will then instruct a printing device to print the combined mark on the substrate (step 509).

In some embodiments, as noted above, to improve detectability and reduce degradation of the fragile microgloss mark, before printing the combined mark the system may modify the correlation mark to allow for an increased concentration of fragile pixels (step 501). It may do this by modifying the correlation mark to exhibit an increased foreground coverage. This may make the correlation mark less easily readable, but the increased availability of foreground pixels may help improve readability of the microgloss mark when printed. In addition, before or when mapping the microgloss mark to the correlation mark (step 507), the system may adjust the detail of the microgloss mark so that it does not significantly degrade the correlation mark when printed.

To adjust the detail of the correlation mark, the system may increase the overall density of the foreground pixels in the area of the microgloss mark. In some embodiments, it may increase the foreground density by between about 5% and 20%, by between about 10% and about 15%, by about 10%, by about 5%, or by another suitable amount that may vary depending on the printer, the application and the desired outcome. When expanding the foreground, it may start with a cluster of one or more pixels and expand it to cover a greater number of pixels. The system will then develop a frame for the combined mark, where the frame is of a determined size to be printed on the substrate. The system will develop a pattern mask that contains a repeating pattern of the correlation mark, which enough instances of the pattern repeated to completely fill the frame, and any excess portions of the repeated pattern cut off at the frame borders.

Figure 6A:
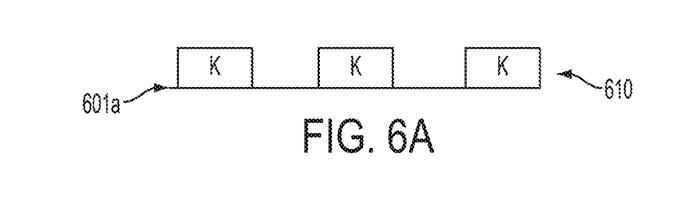
FIGS. 6A-6F illustrate how a correlation mark and microgloss mark may be combined on a substrate.
Figure 6B:
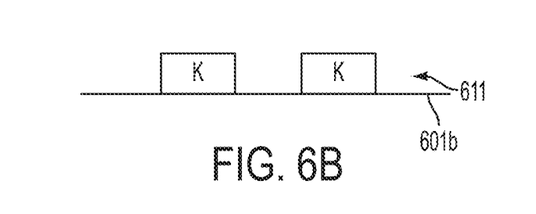
Figure 6C:
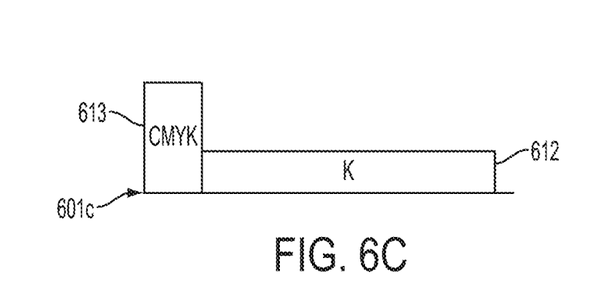
Figure 6D:
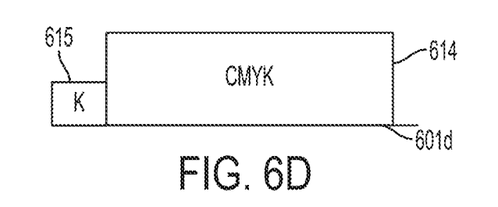

FIGS. 6A-6F illustrate how a correlation mark and microgloss mark may be combined, using a side view of certain pixel elements of each mark for illustration. Each of these figures shows a side view of a substrate 601a-601f with toner elements of various colors (CMYK representing cyan, magenta, yellow and black) extending upward from the substrate at various stack heights. FIGS. 6A and 6B each illustrate an example of elements of a correlation marks in accordance with the prior art. Specifically, in FIGS. 6A and 6B illustrate elements of the character "A" using the pattern of toner elements 610 of FIG. 6A, and a character box surrounding the "A" with the pattern 611 of FIG. 6B. An "A" could also be produced using the inverse, where an "A" could be made using the pattern of FIG. 2 with a character box surrounding it (as is shown in the examples of FIG. 1). FIG. 6C shows an example of elements of a microgloss mark in accordance with the prior art. Here, the elements of the character "B" are made up of the elements of higher pile height 613, while elements of a text box surrounding the "B" are made up of toner elements 612 having a lower pile height. FIG. 6D shows the inverse, where the "B" is made of elements having a lower pile height 614 and a text box surrounding the "B" is made up of elements having a higher pile height 615. As shown, the text boxes of FIGS. 6C and 6D may be made up of one color (e.g., black), while the elements of the character may be made of the same color or a visually similar color.

Figure 6E:
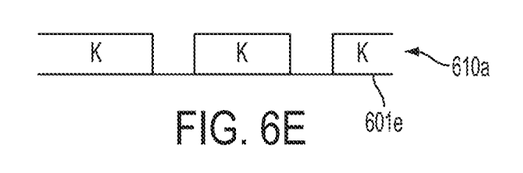

FIG. 6E shows a first step in modifying a correlation mark to combine it with a microgloss mark in accordance with the embodiments of this document. In FIG. 6E, the mark 610 of FIG. 6A is modified so that certain elements (groups of one or more pixels) are made thicker 610a to cover a greater number of pixels while maintaining the same pile height. When the thickness is modified, the system may expand the thickness of each element symmetrically so that the center point of each element remains fixed. The center of the background areas between each element will also remain fixed. Thus, the period of the elements is the same, so the same key will work to decode the correlation mark. Similarly, the pattern of FIG. 2 could be modified to be thicker in a manner similar to that shown in FIG. 6E. This may be done by obtaining a pre-defined thicker font for the correlation mark, or by modifying an existing font for the correlation mark.

Figure 6F:
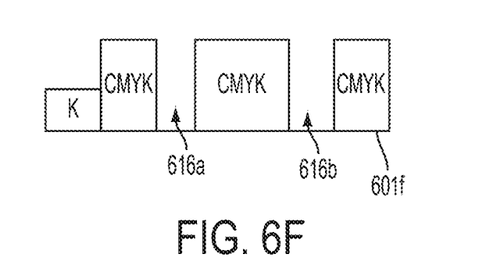

Finally, FIG. 6F shows the combination of the two marks of FIGS. 6D and 6E, such that the spaces 616a-616b between toner elements of the correlation mark are preserved. The spaces 616a-616b may be considered "background pixels" of the correlation mark. In this example, the correlation mark may be considered the "primary" mark, as pixels where the modified correlation mark would normally be printed will be preserved by being printed, and background pixels between the correlation mark's toner elements will also be preserved by remaining free from printed toner. The microgloss mark is printed as normal, but only on pixels where the correlation mark toner would appear, and not on any portions of the substrate that the correlation mark would treat as background.

To adjust the microgloss mark, the system may change a polarity of the signal from indent to profile to not degrade the correlation mark. In other words, referring to FIG. 6F, the system could reverse the pixels so that the "K" pixels are the higher stack height and the "CMYK" pixels are the lower stack height.

Figure 7A:
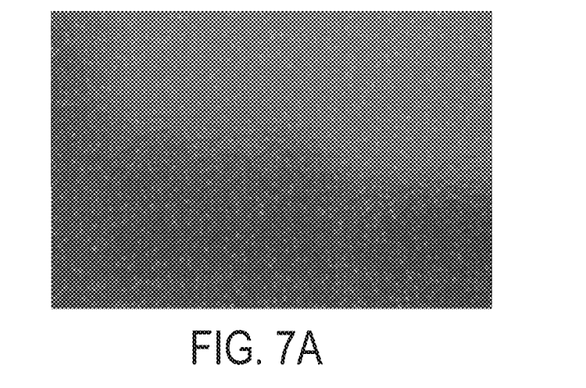
FIGS. 7A-7C illustrate an example of a combined robust and fragile mark as viewed straight on, at an angle, and through a correlation mask.
Figure 7B:
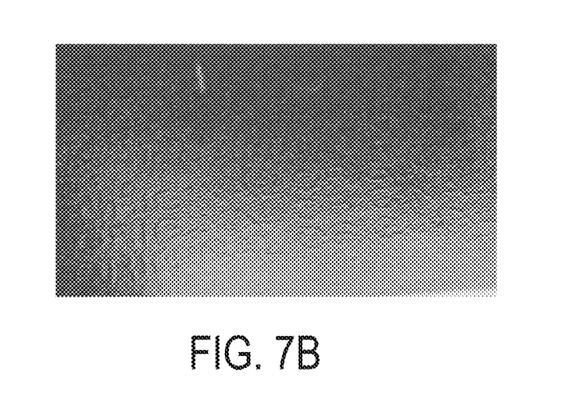
Figure 7C:
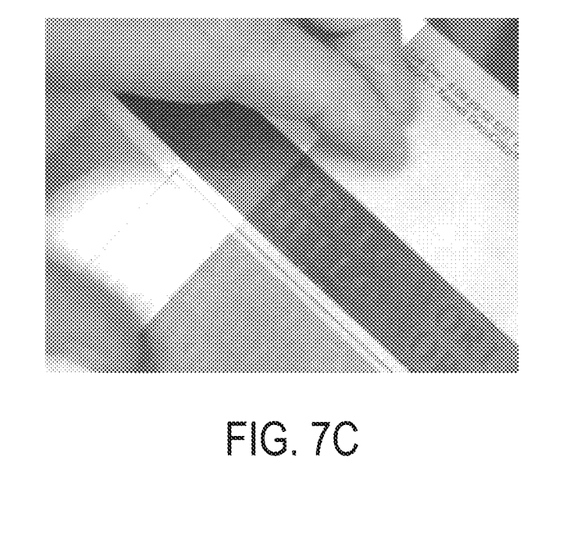

FIG. 7A illustrates an example of a straight-on view of a combined correlation mark element and microgloss mark element. The microgloss element of the combined mark is not visible in this view. FIG. 7B illustrates the same mark from an angle under illumination. From this angle, the microgloss element (the word "original") is visible to the human eye. FIG. 7C shows that the same combined mark may show the correlation mark element (the phrase "hello world") when viewed through a correlation mask.

Figure 8:
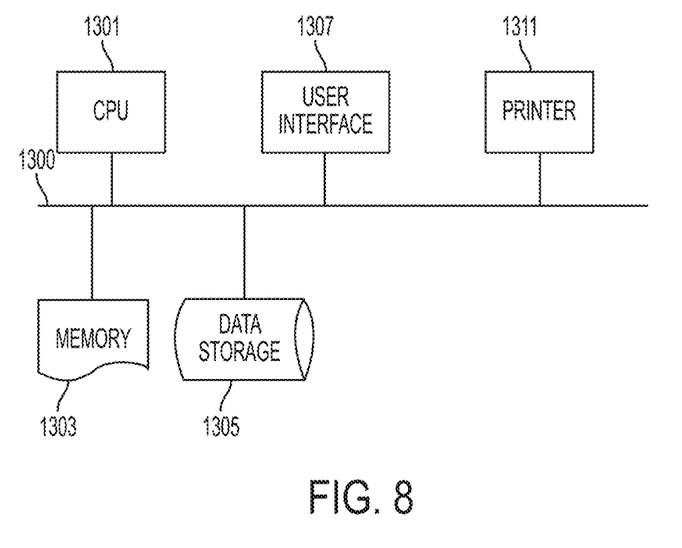
FIG. 8 is a block diagram showing various equipment that may be used to implement various embodiments of the processes described in this document.

FIG. 8 depicts a block diagram of hardware and/or electronics that may make up a system that modifies the mark elements, develops instructions for printing a combined mark, and prints the combined mark. One or more communications lines 1300 such as a bus (for a single device) or network (for multiple devices) may interconnect the illustrated components and allow data and/or signals to flow between the components. CPU 1301 represents one or more processors that performs calculations and logic operations required to execute a program. Any number of processors may be available, and they may be part of a single electronic device or distributed across any number of networked electronic devices. When this document and its claims uses the term "processor," unless specifically stated otherwise it is intended to refer to all such embodiments (i.e., single processor or multiple processors). The processor(s) may access a computer-readable memory device 1303 containing programming instructions, along with a data storage facility 1305 such as a database that stores the package generation templates and/or rule sets.

A user interface 1307 is a device or system that provides output to, and receives input from, a user. The user interface may include a display, audio output, a printer, or another element that provides information to a user. The user interface 1307 also may include a touch-sensitive component, microphone, audio port, keyboard, mouse, touch pad, or other input mechanism that is capable of receiving user input. The system also may include one or more printing devices 1311, each of which contains hardware that enables it to print marks on a substrate. The printing device(s) will, individually or collectively, will contain toner reservoirs with non-gloss toner that is suitable for a correlation mark, as well as gloss toner that is suitable for a microgloss mark. As used in this document, the term "reservoir" means any structure that holds toner, which may be in liquid, solid, gel, or other form.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of embedding a plurality of security elements in a document, comprising, by a processor:
    identifying a first set of instructions for printing a correlation mark security element on a substrate, the correlation mark security element comprising a plurality of foreground pixels and a plurality of background pixels;
    creating a mask for printing the correlation mark security element on the substrate;
    identifying a second set of instructions for printing a microgloss security element on the substrate, the microgloss security element comprising a plurality of microgloss pixels to which toner will be applied at a plurality of thicknesses;
    mapping one or more instances of microgloss security element to one or more instances of the correlation mark element through the mask to yield a combined mark in which the toner of the microgloss security element will only be printed where the foreground pixels appear and not where the background pixels appear; and
    by a printing device, printing the combined mark on the substrate.

2. The method of claim 1, further comprising, before creating the mask, modifying the correlation mark security element to increase a density of the foreground pixels in at least one area on which the microgloss security element pixels will be printed.

3. The method of claim 2, wherein modifying the correlation mark security element to increase the density of the foreground pixels in at least one area comprises, for the at least one area:
    expanding a foreground section in that area while maintaining the foreground section's center point location; and
    reducing a corresponding thickness of a corresponding background section while maintaining a center point location for the background section.

4. The method of claim 1, wherein creating the mask for printing the correlation mark security element on a substrate comprises defining a rule set for printing toner at locations on the substrate that correspond to the foreground pixels of the correlation mark security element while not printing toner at locations on the substrate that correspond to the background pixels of the correlation mark.

5. The method of claim 1, wherein mapping the instances of the microgloss security element to the one or more instances of the correlation mark element through the mask comprises eliminating any pixels of the microgloss element that would, if printed, appear on or under background pixels of the modified correlation mark element.

6. The method of claim 5, wherein mapping the instances of the microgloss security element to the one or more instances of the correlation mark element through the mask comprises overwriting any pixels of the correlation mark element that coincide with any pixel of the microgloss element.

7. The method of claim 1, wherein printing the combined mark on the substrate comprises:
    printing a first color on the substrate at locations where the correlation mark alone would appear but not at locations where a second color of the microgloss mark alone would appear; and
    printing the second color of the microgloss mark on the substrate at locations where both the correlation mark and the second color microgloss mark would appear.

8. The method of claim 7, further comprising printing neither the first color nor the second color on the substrate at locations that correspond to background pixels of the correlation mark.

9. A system for printing a secure document, comprising:
    a processor;
    a printing device;
    a data storage facility containing programming instructions that, when executed by the processor, cause the processor to:

identify a first set of instructions for printing a correlation mark security element on a substrate, the correlation mark security element comprising a plurality of foreground pixels and a plurality of background pixels, create a mask for printing the correlation mark security element on the substrate, identify a second set of instructions for printing a microgloss security element on the substrate, the microgloss security element comprising a plurality of microgloss pixels to which toner will be applied at a plurality of thicknesses, and mapping one or more instances of microgloss security element to one or more instances of the correlation mark element through the mask to yield a set of instructions to print combined mark in which the toner of the microgloss security element will only be printed by the printing device where the foreground pixels appear and not where the background pixels appear.

10. The system of claim 9, further comprising programming instructions that cause the processor to, before creating the mask, modify the correlation mark security element to increase a density of the foreground pixels in at least one area on which the microgloss security element pixels will be printed.

11. The system of claim 10, wherein the instructions to modify the correlation mark security element to increase the density of the foreground pixels in at least one area comprise instructions to, for the at least one area:

expand a foreground section in that area while maintaining the foreground section's center point location, and reduce a corresponding thickness of a corresponding background section while maintaining a center point location for the background section.

12. The system of claim 9, wherein the instructions to create the mask for printing the correlation mark security element on a substrate comprise instructions to define a rule set for printing toner at locations on the substrate that correspond to the foreground pixels of the correlation mark security element while not printing toner at locations on the substrate that correspond to the background pixels of the correlation mark.

13. The system of claim 9, wherein the instructions to map the instances of the microgloss security element to the one or more instances of the correlation mark element through the mask comprises instructions to eliminate any pixels of the microgloss element that would, if printed, appear on or under background pixels of the modified correlation mark element.

14. The system of claim 13, wherein the instructions to map the instances of the microgloss security element to the one or more instances of the correlation mark element through the mask comprise instructions to overwrite any pixels of the correlation mark element that coincide with any pixel of the microgloss element.

15. The system of claim 9, wherein the instructions to print the combined mark comprise instructions to:

print a first color on the substrate at locations where the correlation mark alone would appear but not at locations where a second color of the microgloss mark alone would appear; and print the second color of the microgloss mark on the substrate at locations where both the correlation mark and the second color microgloss mark would appear.

16. The system of claim 15, wherein the instructions to print the combined mark on the substrate comprise instructions to print neither the first color nor the second color on the substrate at locations that correspond to background pixels of the correlation mark.

17. A document, comprising:

a frame of a combined correlation mark and microgloss mark printed on a substrate, the frame comprising:

foreground pixels of the correlation mark in a toner of a first color, wherein the first color is distinct from an area of the substrate on which background pixels of the correlation mark will appear; and pixels of the microgloss mark in a toner of a second color, over positions where both the microgloss mark and correlation mark appear on the substrate;

wherein the background pixels of the correlation mark exhibit neither the first color nor the second color.

18. The document of claim 17, wherein the pixels of the microgloss mark have a pile height that is greater than that of the pixels of the correlation mark.

* * * * *